Dec. 16, 1924.
1,519,851
R. LIEBAU
AUTOMATIC AIR SPRING
Original Filed Feb. 26, 1919
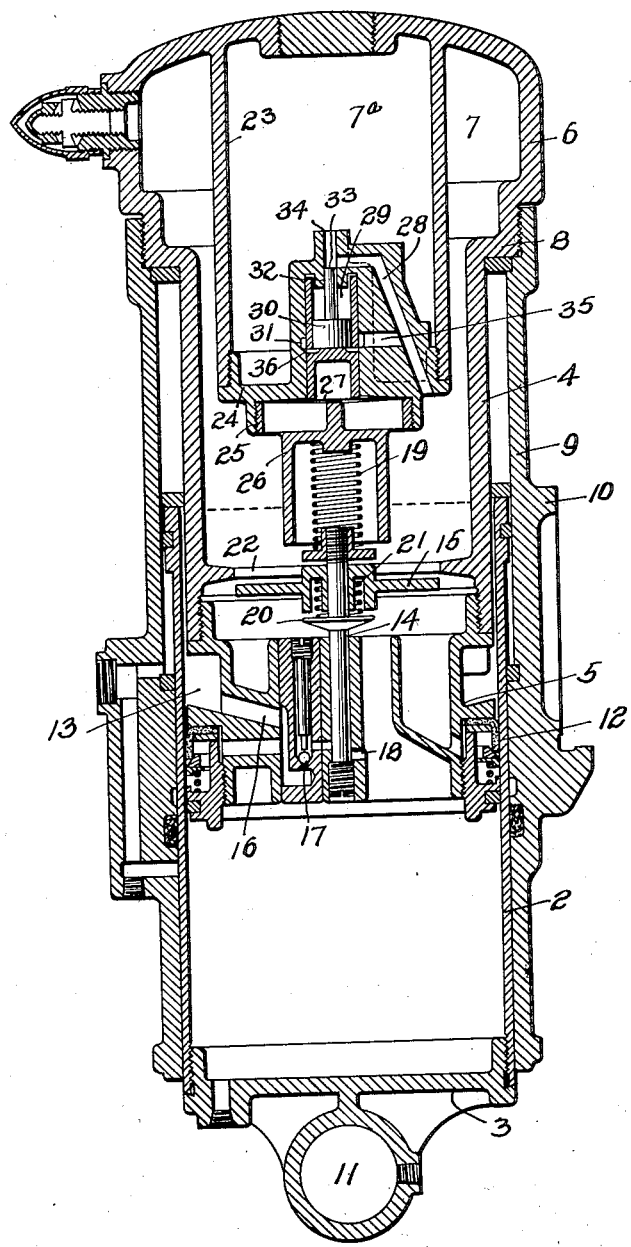
INVENTOR.
Richard Liebau
BY Jno. S. Green.
HIS ATTORNEY IN FACT Patented Dec. 16, 1924.

1,519,851

UNITED STATES PATENT OFFICE.

RICHARD LIEBAU, OF NEW HAVEN, CONNECTICUT, ASSIGNOR TO THE WESTINGHOUSE AIR SPRING COMPANY, A CORPORATION OF PENNSYLVANIA.

AUTOMATIC AIR SPRING.

Application filed February 26, 1919, Serial No. 279,426. Renewed October 6, 1924.

*To all whom it may concern:*

Be it known that I, RICHARD LIEBAU, a citizen of the United States, and a resident of New Haven, in the county of New Haven and State of Connecticut, have made a new and useful Invention in Automatic Air Springs, of which the following is a specification.

This invention relates to vehicle air springs and as an object has the provision of an air spring the cushion chamber of which will be automatically reduced in capacity to meet the requirements of abnormal load conditions.

This, as well as other objects which will readily appear to those skilled in this art, I attain in the device illustrated in the drawings accompanying and forming a part of this application and in which the single view represents in sectional elevation an air spring embodying this invention.

The spring consists of a lower cylindrical member 2 having a cylinder bottom 3 and within which a cylinder 4 carrying a plunger head 5 telescopes.

Cylinder 4 at its top 6 is enlarged to form with the interior of the cylinder a cushion chamber 7 and threaded at 8 to the enlarged portion is a cylindrical guard member 9 which surrounds cylinder 2 and not only serves as a mud and dust guard therefor but also as a guide.

Guard member 9 is adapted to be secured to the load platform or frame of a motor vehicle such as a truck and a pad or face 10 is provided for the purpose of securing the air spring to a suitable bracket carried on the frame of the vehicle.

Cylinder bottom 3 by means of an eye 11 is adapted to be secured to one end of the steel spring of the vehicle adjacent thereto, this arrangement causes the air spring to operate in series with the steel spring in supporting the load. Plunger head 5 is provided with a cup leather packing 12 and with a collecting chamber 13 arranged on the low pressure side of the packing for the purpose of collecting the sealing oil which finds its way past the cup leather packing.

A pump having a plunger 14 operated by means of an actuator 15 has its inlet connected to the outlet 16 of the collecting chamber and a ball check valve 17 is provided for preventing the return of liquid to the collecting chamber.

The plunger 14 forces the oil from the collecting chamber into the cushion chamber of the device through a restricted port 18. A coil spring 19 yieldingly holds the pump plunger in its lowermost position and the actuator 15 which is free to move on the upper part of the pump plunger above disk 20 which is formed integral therewith is yieldingly forced upward by means of a coil spring 21.

A constriction formed by annular flange 22 is provided and this constriction is closed by actuator 15 as the air spring is extended and collapsed.

The air spring is charged with oil about to the level shown in dotted lines and as the spring is extended and collapsed the oil is caused to flow back and forth through the constriction thereby causing the actuator to reciprocate the pump plunger.

Head 6 of the inner cylinder 4 is provided with a depending cylindrical flange 23 and into the lower end of this flange a head 24 is threaded.

The underside of head 24 is provided with an integrally threaded flange 25 and into this a member 26 is screwed. This member 26 forms a housing for coil spring 19 and also a retainer for a thin metal diaphragm 27 which is normally dished downwardly at its center as shown in the drawing.

The interior of cylinder 23 which forms a cushion chamber 7ª is placed in communication with cushion chamber 7 by means of a passage 28.

At its center, head 24 is provided with a cylindrical bore 29 and within this cylinder a valve 30 is positioned.

This valve 30 rests on diaphragm 27 and is provided with a partition 31 which at its center forms a support for a valve 32. The lower part of this valve fits within the cylindrical valve 30 and the upper part 33 of reduced section is adapted to slide within a reduced bore 34 of the head 24 in order to control the flow of fluid through passage 28.

A passage 35 connects passage 28 with bore 29 through ports 36 which are formed through the walls of cylinder valve 30 above partition 31.

In operation, if the load is a normal load, cushion chambers 7 and 7ª will be in communication through passage 28 and will operate jointly as the cushion chamber of the device. If the spring is suddenly called upon to sustain an abnormal load the sudden increase in pressure in cushion chamber 7 acting on the underside of diaphragm 27 will raise cylinder 30 so that ports 36 will register with passage 35 permitting the increased pressure to act on the lower face of cylindrical member 32 thereby raising valve 33 and cutting off passage 28 from communication with cushion chamber 7ª.

As soon as the abnormal load is removed and the pressure therefore reduced in cushion chamber 7 the downward deflection of the diaphragm to normal position will permit valves 30 and 33 to return to the position shown in the drawing. The return of the valves to normal position will place chambers 7ª and 7 in communication through passage 28.

Having thus described my invention what I claim is—

1. In an air spring, two cushion chambers, means placing said chambers in communication, and pressure responsive means operating upon an increase of pressure in one only of the chambers to close communication between said chambers.

2. In an air spring, a main cushion chamber, a supplemental cushion chamber, a normally open passage between said chambers, and pressure responsive means for closing said passage upon an increase in said main cushion chamber.

3. In combination in an air spring, two relatively movable members enclosing a chamber of variable volumetric capacity, an auxiliary chamber normally in communication with the first mentioned chamber, and a valve mechanism responsive to variations in pressure within the first mentioned chamber and independent of the relative positions of said members for closing communication between said chambers.

4. In combination in an air spring, two relatively movable members enclosing a chamber of variable volumetric capacity, an auxiliary chamber normally in open communication with said chamber, and means responsive to variations in pressure within the first mentioned chamber and substantially independent of the relative positions of said members for closing communication between said chambers.

5. In combination in an air spring, two relatively movable members enclosing a chamber of variable volumetric capacity, an auxiliary chamber normally in open communication with said chamber, a pressure actuated valve for closing communication between said chambers and pressure responsive means, responsive to variations in pressure within the first mentioned chamber for controlling the operation of said valve.

6. In combination in an air spring, two relatively movable members enclosing a chamber of variable volumetric capacity, an auxiliary chamber, a valve mechanism for controlling communication between said chambers, and pressure responsive means responsive to variations of pressure within the first mentioned chamber and substantially independent of the relative positions of said members for controlling the operation of said valve.

7. In combination in a pneumatic spring device, two relatively movable members enclosing a chamber of variable volumetric capacity, an auxiliary chamber, and means independent in operation of the relative positions of said members for controlling communication between said members.

8. In combination in a pneumatic spring, two relatively movable members enclosing a chamber of variable volumetric capacity, an auxiliary chamber, a valve for controlling communication between said chambers, a pressure responsive diaphragm responsive to variations in pressure within the first mentioned chamber for controlling the operation of said valve.

9. In combination in a pneumatic spring, two relatively movable members enclosing a chamber of variable volumetric capacity, an auxiliary chamber, a pressure actuated valve for controlling communication between said chambers, means for controlling the delivery of actuating pressure to said valve, and a device independent of the relative positions of said members for controlling the operation of said means.

10. In combination in a pneumatic spring, two relatively movable members enclosing a chamber of variable volumetric capacity, an auxiliary chamber, a pressure actuated valve for controlling communication between said chambers, means for controlling the delivery of actuating pressure to said valve, and a pressure responsive device responsive to variations in pressure within said chamber and independent of the relative positions of said members for controlling the operation of said means.

11. In combination in a pneumatic spring, two relatively movable members enclosing a chamber of variable volumetric capacity, an auxiliary chamber, and a sluggishly operating mechanism responsive to pressure within said chamber and independent of the relative positions of said members for controlling communication between said chambers.

12. In combination in a pneumatic spring, two relatively movable members enclosing a chamber of variable volumetric capacity, an auxiliary chamber, and two pressure responsive valves, one acting in response to the operation of the other for controlling communication between said chambers.

In testimony whereof, I have hereunto subscribed my name this 2nd day of December, 1918.

RICHARD LIEBAU.